United States Patent
Yang et al.

(10) Patent No.: US 10,521,437 B2
(45) Date of Patent: Dec. 31, 2019

(54) RESOURCE PORTFOLIO PROCESSING METHOD, DEVICE, APPARATUS AND COMPUTER STORAGE MEDIUM

(71) Applicant: BAIDU ONLINE NETWORK TECHNOLOGY (BEIJING) CO., LTD., Beijing (CN)

(72) Inventors: Xing Yang, Beijing (CN); Xiaojing Yang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 281 days.

(21) Appl. No.: 15/313,552

(22) PCT Filed: Dec. 21, 2015

(86) PCT No.: PCT/CN2015/098084
§ 371 (c)(1),
(2) Date: Nov. 22, 2016

(87) PCT Pub. No.: WO2017/054330
PCT Pub. Date: Apr. 6, 2017

(65) Prior Publication Data
US 2017/0286428 A1   Oct. 5, 2017

(30) Foreign Application Priority Data
Sep. 29, 2015   (CN) .......................... 2015 1 0633816

(51) Int. Cl.
*G06F 17/30*     (2006.01)
*G06F 16/2457*   (2019.01)
(Continued)

(52) U.S. Cl.
CPC .... *G06F 16/24578* (2019.01); *G06F 16/2228* (2019.01); *G06F 16/285* (2019.01); *H04L 41/12* (2013.01)

(58) Field of Classification Search
CPC ..... H04L 41/12; G06F 15/285; G06F 15/951; G06F 15/2228; G06F 15/24578
(Continued)

(56) References Cited

U.S. PATENT DOCUMENTS 6,792,399 B1   9/2004   Phillips et al.
8,494,940 B1   7/2013   Phillips et al.
(Continued)

FOREIGN PATENT DOCUMENTS

CN   101246499 A   8/2008
CN   102073699 A   5/2011
(Continued)

OTHER PUBLICATIONS

International Search Report for PCT/CN2015/098084 dated Jun. 29, 2016, and its English translation provided by WIPO.
(Continued)

*Primary Examiner* — Jean M Corrielus
(74) *Attorney, Agent, or Firm* — Ladas & Parry, LLP

(57) ABSTRACT

The invention provides a resource portfolio processing method, device, apparatus, and computer storage medium. The method comprises: acquiring search popularity ratings to which respective network resources belong, based on search volume data of the respective network resources in a network resource portfolio; evaluating the portfolio value of the network resource portfolio to obtain an evaluation result, based on the search popularity ratings to which the respective network resources belong; determining whether or not the network resource portfolio needs to be adjusted based on the evaluation result. The technical solutions of the inven-
(Continued)

tion solves the problem of how to determine whether it is necessary to adjust a network resource portfolio so as to facilitate the timely adjustment of the network resource portfolio and give full play to the advantages of network resources.

24 Claims, 1 Drawing Sheet

(51) Int. Cl.
*G06F 16/28* (2019.01)
*G06F 16/22* (2019.01)
*H04L 12/24* (2006.01)

(58) Field of Classification Search
USPC .............................................. 705/23, 25, 28
See application file for complete search history.

(56) References Cited

U.S. PATENT DOCUMENTS

| | | | | |
|---|---|---|---|---|
| 8,960,535 | B2* | 2/2015 | Barnes | G06Q 10/087 235/377 |
| 2005/0038718 | A1* | 2/2005 | Barnes | G06Q 10/087 705/28 |
| 2005/0171885 | A1* | 8/2005 | Christman | G06Q 40/06 705/36 R |
| 2007/0185827 | A1* | 8/2007 | Mrzyglocki | G06F 17/30 |
| 2009/0182725 | A1 | 7/2009 | Govani et al. | |
| 2009/0186689 | A1* | 7/2009 | Hughes | G06Q 30/0216 463/25 |
| 2010/0280976 | A1* | 11/2010 | Carpenter | G06Q 40/06 705/500 |
| 2010/0293157 | A1* | 11/2010 | Ito | G06F 17/30265 707/723 |
| 2014/0052669 | A1* | 2/2014 | Torre | G06Q 40/00 705/36 R |
| 2014/0379590 | A1* | 12/2014 | Germeraad | G06Q 50/184 705/310 |
| 2015/0161641 | A1* | 6/2015 | Barnes | G06Q 10/087 705/14.23 |
| 2015/0227517 | A1* | 8/2015 | Lymberopoulos | G06F 17/30132 707/706 |
| 2016/0132805 | A1* | 5/2016 | Delacourt | G06Q 10/06313 705/7.23 |
| 2016/0132806 | A1* | 5/2016 | To | G06Q 10/06313 705/7.23 |
| 2016/0132808 | A1* | 5/2016 | To | G06Q 10/06315 705/7.25 |

FOREIGN PATENT DOCUMENTS

| | | |
|---|---|---|
| CN | 102419773 A | 4/2012 |
| CN | 104731876 A | 6/2015 |
| CN | 104881472 A | 9/2015 |
| JP | 2011081452 A | 4/2011 |
| JP | 2013140579 A | 7/2013 |
| KR | 20040079871 A | 9/2004 |
| KR | 20090117109 A | 11/2009 |
| KR | 20100029581 A | 3/2010 |
| KR | 101593876 B1 | 2/2016 |
| WO | 2003065254 A1 | 8/2003 |
| WO | 2006095748 A1 | 9/2006 |
| WO | 2008028084 A2 | 3/2008 |

OTHER PUBLICATIONS

Written Opinion for PCT/CN2015/098084 dated Jun. 29, 2016, and its English translation provided by WIPO.
The International Preliminary Report on Patentability (Chapter 1) dated Apr. 3, 2018, and its English translation provided by WIPO.
The first office action for Chinese patent application CN 201510633816. 2, dated Jan. 22, 2018, and its English Machine translation provided by Google Translate.
Search Report for Chinese patent application CN 201510633816.2, dated Sep. 29, 2015.
International Search Report for PCT/CN2015/098084 dated Jun. 29, 2016 and its English machine translation provided by Google Translate.
Written Opinion for PCT/CN2015/098084 dated Jun. 29, 2016 and its English machine translation provided by Google Translate.
Extended European Search Report from EP app. No. 15892066.0, dated Mar. 27, 2019.
Notification of Reasons for Refusal from JP app. No. 2016-567091, dated Oct. 31, 2017, with machine English translation.
Decision to Grant a Patent from JP app. No. 2016-567091, dated Feb. 6, 2018, with machine English translation from Global Dossier.
Notification of Reason for Refusal from KR app. No. 2016-7031107, dated Oct. 31, 2017, with English translation from Global Dossier.
Notice of Allowance from KR app. No. 2016-7031107, dated May 21, 2018, with English translation from KIPO.

* cited by examiner

RESOURCE PORTFOLIO PROCESSING METHOD, DEVICE, APPARATUS AND COMPUTER STORAGE MEDIUM

CROSS-REFERENCE TO RELATED APPLICATIONS

The present application is the U.S. national phase of PCT Application PCT/CN2015/098084 filed on Dec. 21, 2015, which claims the priority of Chinese Patent Application No. 201510633816.2, filed on Sep. 29, 2015, which are incorporated herein by reference in their entireties.

The present application claims the priority of Chinese Patent Application No. 201510633816.2, filed on Sep. 29, 2015, with the title of "Resource portfolio processing method and device".

TECHNICAL FIELD

The present invention relates to the field of Internet technology, and more particularly, to a resource portfolio processing method, device, apparatus, and computer storage medium.

BACKGROUND

With the rapid development of information technology, network resources show explosive growth. A network resource portfolio may produce more beneficial results. For example, in the field of information pushing, the portfolio of a user's location resources and demand resources can push, to the user, more information in line with user's needs, which helps to improve the accuracy of information pushing. As another example, in the field of investment banking, buying a portfolio of a variety of financial products can reduce investment risk, and helps to improve investment income.

In different periods or different scenarios, the beneficial effects a network resource portfolio can bring may be different, which means that the network resource portfolio are not static, needs constantly adjustment of the network resource portfolio. However, how to determine whether it is necessary to adjust the network resource portfolio is the first problem to solve.

SUMMARY

Aspects of the invention provides a resource portfolio processing method and a device for determining whether it is necessary to adjust the network resource portfolio to facilitate the timely adjustment of the network resource portfolio.

According to an aspect of the present invention, there is provided a resource portfolio processing method, comprising:

acquiring search popularity ratings to which respective network resources belong, based on search volume data of the respective network resources in a network resource portfolio;

evaluating the portfolio value of the network resource portfolio to obtain an evaluation result, based on the search popularity ratings to which the respective network resources belong;

determining whether or not the network resource portfolio needs to be adjusted based on the evaluation result.

According to another aspect of the present invention, there is provided a resource portfolio processing device comprising:

an acquisition module, for acquiring search popularity ratings to which respective network resources belong, based on search volume data of the respective network resources in a network resource portfolio;

an evaluation module, for Evaluating the portfolio value of the network resource portfolio to obtain an evaluation result, based on the search popularity ratings to which the respective network resources belong;

a determination module, for determining whether or not the network resource portfolio needs to be adjusted based on the evaluation result.

As can be seen from the above technical solutions, the invention solves the problem of how to determine whether it is necessary to adjust a network resource portfolio so as to facilitate the timely adjustment of the network resource portfolio and give full play to the advantages of network resources, through the following: acquiring search popularity ratings to which respective network resources belong, based on search volume data of the respective network resources in a network resource portfolio; evaluating the portfolio value of the network resource portfolio to obtain an evaluation result, based on the search popularity ratings to which the respective network resources belong; determining whether or not the network resource portfolio needs to be adjusted based on the evaluation result.

DETAILED DESCRIPTION

To make the object, technical solutions, and advantages of the present invention more apparent, we will describe the present invention below in detail in conjunction with the accompanying drawings and specific embodiments.

Figure 1:
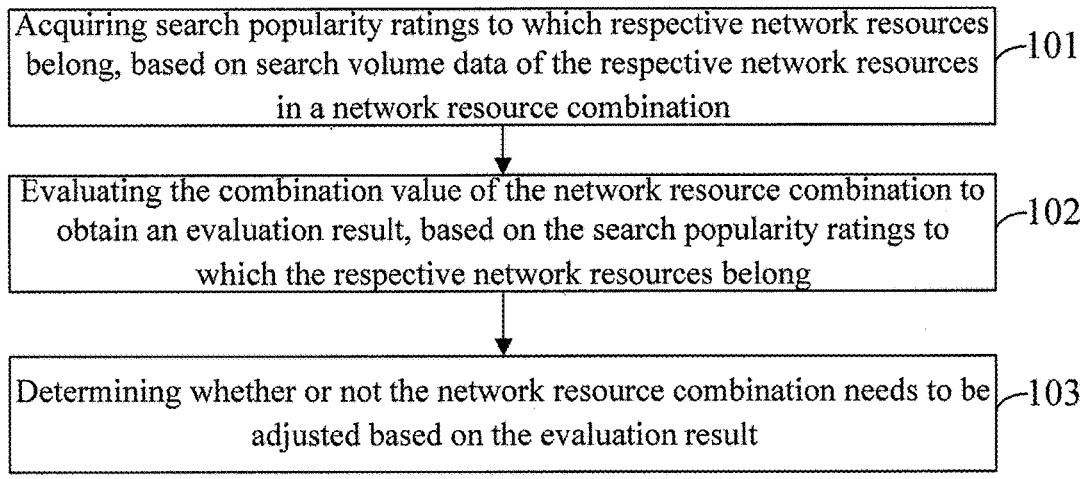
FIG. 1 is the flowchart of the method for resource portfolio processing method according to one embodiment of the present invention.

FIG. 1 is the flowchart of a resource portfolio processing method according to one embodiment of the present invention. As shown in FIG. 1, the method comprises:

101. Acquiring search popularity ratings to which respective network resources belong, based on search volume data of the respective network resources in a network resource portfolio.

102. Evaluating the portfolio value of the network resource portfolio to obtain an evaluation result, based on the search popularity ratings to which the respective network resources belong.

103. Determining whether or not the network resource portfolio needs to be adjusted based on the evaluation result.

The present embodiment does not limit the types of network resources involved in a network resource portfolio, which may be a portfolio of various types of network resources. For example, the network resource portfolio of the present embodiment may be a portfolio of various information resources such as a user's search behavior resources, a user's location resources, a user's demand resources, a user's propensity resources, and the like; such a portfolio of user personal information can fully show the attribute information of the user. For another example, the network resource portfolio of the present embodiment may be a portfolio of various merchandise resources, such as a portfolio of coats, hats, shoes, and the like, which can adequately satisfy a user's shopping needs and maximize the benefits of sellers. As another example, the network resource portfolio of the present embodiment may be an investment resource portfolio in the field of investment and finance, for example, a portfolio of stock resources; accordingly, the respective network resources in the network resource portfolio may be stock resources. For example, a stock resource portfolio can be a portfolio of various stocks such as Silver Billion Shares, Emerging Cast Pipe, Beijing Culture, and Yituo Shares.

Compared with a single network resource, a network resource portfolio can produce more beneficial effects; but the beneficial effects of the network resource portfolio may change at different times or different scenarios, and the network resource portfolio needs to be adjusted in time. The adjustment of a network resource portfolio mainly refers to the process of replacing, deleting, and increasing network resources in the network resource portfolio to form a new network resource portfolio. Before one can adjust his network resource portfolio, one needs to determine whether he needs to adjust his network resource portfolio. The resource portfolio processing method provided by the present embodiment solves this problem, and gives information on whether or not the network resource portfolio needs to be adjusted. The main principle of the method is to make real-time evaluation of the portfolio value of the network resource portfolio based on the search popularity degree of the respective network resources in the network resource portfolio and to judge whether the resource portfolio needs to be adjusted according to the evaluation result. Generally speaking, if the evaluation result indicates that the portfolio value of the network resource portfolio is high, there is no need to adjust the network resource portfolio. If the evaluation result indicates that the portfolio value of the network resource portfolio is very low, the network resource portfolio needs to be adjusted. The portfolio value of the network resource portfolio may be compared with a certain evaluation index threshold to determine whether the portfolio value of the network resources is high or not. But the embodiment is not limited to this.

The principle and the process according to the method of the present embodiment will be described in detail below.

In a time when the concept of "Internet+" prevails, as one of the core data of the Internet, the value of the search volume data has become increasingly prominent. The search volume data of a network resource can reflect, to a certain extent, the search popularity degree of the network resource and users' moods towards the network resource. High search volume of a network resource represents high attention drawn to it; low search volume of the network resource indicates that it is not noticed a lot. If the network resources in a network resource portfolio all receive a large amount of attention, the network resource portfolio will be receiving a large amount of attention, which, to a certain extent, reflects high portfolio value of the network resource portfolio; on the contrary, if the network resources in a network resource portfolio all receive no attention, the network resource portfolio will be receiving no attention, which, to a certain extent, reflects low portfolio value of the network resource portfolio. Accordingly, for a given network resource portfolio, the portfolio value of the network resource portfolio can be evaluated through the search popularity degrees (i.e., the magnitude of the search volume) of respective network resources the portfolio contains.

In the present embodiment, search popularity degrees are divided into different search popularity ratings, and the portfolio value of a network resource portfolio is evaluated based on the search popularity ratings to which the respective network resources in the network resource portfolio belong. Herein, it helps to reduce the volume of data to be processed, simplify the processing, and improve the processing efficiency by dividing the searching popularity degrees into different search popularity ratings.

Alternatively, an embodiment for search popularity rating dividing comprises: determining the network resource category to which the network resource portfolio relates and determining at least one popularity rating threshold based on the search popularity degrees of all available network resources under the network resource category; thereafter determining the corresponding popularity rating of the network resource category based on the at least one popularity rating threshold.

Alternatively, prior to determining the at least one popularity rating threshold, the search popularity degrees of all available network resources under the network resource category may be filtered to remove anomaly values, and then the popularity rating threshold may be determined based on the filtered search popularity degrees. For example, the filtered search popularity degrees may be divided into a number of equal portions, and the popularity ratings at the dividing points can be taken as popularity rating thresholds. Assuming that the filtered search popularity degrees are divided into five equal parts, the search popularity degrees can be divided into five ratings: high, relatively high, medium, relatively low, and low search popularity ratings, or popularity ratings five, four, three, two and one.

The above-mentioned available network resources actually refer to the effective network resources under the network resource category. According to different application scenarios, "effective" and "invalid" can be defined adaptively. Taking commodity resources as an example, the goods that are already off the shelf or not on sale can be taken as invalid network resources. As another example, a validness period may be defined, a network resource occurring or searched by a user within a validness period is regarded as an effective network resource, and other network resources are regarded as invalid network resources.

Based on the above-mentioned division of search popularity ratings, the search volume data of respective network resources in a network resource portfolio can be obtained from search logs of various search engines, and then the search popularity ratings of respective network resources are obtained according to the search volume data of respective network resources. And then one can evaluate the portfolio value of the network resource portfolio based on the search popularity degree of the respective network resources to obtain the evaluation result and determines whether the network resource portfolio needs to be adjusted based on the evaluation result.

In an alternative embodiment, the search popularity degrees of respective network resources may be determined based on the search volume data of respective network resources, and the search popularity ratings to which the respective network resources belong may be determined based on the search popularity degrees of respective network resources and the preset popularity rating threshold.

Further, the above-described step of determining the search popularity degrees of respective network resources based on the search volume data of the respective network resources may employ, but not limited to, the following approaches:

In one approach, the search volume data for a network resource may be directly used as the search popularity degree for the available network resource.

In another approach, the search volume data of the network resource is subjected to numerical processing, such as exponential, logarithmic, or weighted processing of the search volume data, and the result of the numerical processing is taken as the search popularity degree of the network resource.

In yet another approach, taking into account that search volume data of a network resource is constantly changing, a time unit may be taken, for example, one day as a time unit, one hour as a time unit, one month as a time unit; then, one may use the search volume data in at least one time unit prior to the current time unit, to obtain the search popularity degree in the current time unit. For example, the search popularity degree for a network resource may be calculated according to the following formula.

$$\text{schpop}_{i,T} = \text{schvol}_{i,T-1}/\text{schvol}_{i,T-2} \quad (1)$$

in the above formula (1), $\text{schpop}_{i,T}$ signifies the search popularity degree of an $i^{th}$ network resource in a time unit T, $\text{schvol}_{i,T-1}$ signifies the search volume data of the $i^{th}$ network resource in the time unit T-1, and $\text{schvol}_{i,T-2}$ signifies the search volume data of the $i^{th}$ network resource in the time unit T-2.

It is worth noting that the above-mentioned approaches can be used not only to calculate the search popularity degrees of the network resources in the network resource portfolio but also to calculate the searchable network resources available under the network resource category involved in the network resource portfolio.

In an alternative embodiment, the above step of evaluating the portfolio value of a network resource portfolio to obtain an evaluation result, based on the search popularity ratings to which respective network resources belongs comprises:

doing statistics on the search popularity ratings to which the respective network resources belong, so as to determine a set of searching popularity ratings related to the network resource portfolio;

obtaining a weight and a value in the network resource portfolio for each search popularity rating in the set of search popularity rating;

calculating at least one evaluation index value based on the weight and the value in the network resource portfolio for each searching popularity rating in the set of search popularity ratings;

and evaluating the portfolio value of the network resource portfolio to obtain an evaluation result, based on the at least one evaluation index.

Taking the cases where the portfolio of the network resources is a one-million stock portfolio as the example, the portfolio of stocks is shown in Table 1:

TABLE 1

| Stock code | Stock name | Bid Price | Day Closing Position | Open Position Category | Search popularity rating | Industry |
|---|---|---|---|---|---|---|
| 000981.SZ | Silver Billion Shares | 30.6 | 29.05 | 33200 | Relatively high | Real estate |
| 000778.SZ | Emerging Cast Pipe | 12.92 | 12.92 | 49800 | Medium | Steel |
| 000802.SZ | Beijing Culture | 35.53 | 33.8 | 28500 | Low | Media |
| 601038.SH | Yituo Shares | 14.36 | 14.1 | 73200 | High | Mechanical Equipment |
| 002267.SZ | Shaanxi Natural Gas | 17.37 | 17.1 | 59100 | Relatively Low | Utilities |

As can be seen from the above Table 1, the set of search popularity ratings involved in the stock resource portfolio includes five search popularity ratings, namely, high, relatively high, medium, relatively low, and low search popularity ratings.

The portfolio of the weight and the value in the network resource portfolio for each search popularity rating in the set of search popularity ratings are combined, used to reflect the contribution of the search popularity rating to the portfolio value of the network resource portfolio. Alternatively, the step of calculating at least one evaluation index value based on the weight and the value in the network resource portfolio for each searching popularity rating in the set of search popularity ratings comprises:

obtaining, for each search popularity rating in the set of search popularity ratings, a weight in the network resource portfolio for the search popularity rating based on a resource percentage of the resources belonging to the search popularity rating, and a value in the network resource portfolio for the search popularity rating based on an independent value of the resources belonging to the search popularity rating.

For example, the resource percentage of the network resources belonging to a search popularity rating may be used to represent the weight of the search popularity rating in the network resource portfolio. Similarly, the sum of the independent values of the network resources belonging to the search popularity rating can be used to represent the value of the search popularity rating in the network resource portfolio.

Still taking the above portfolio of stocks as an example, the resource percentage of network resources can be represented by the percentage of stock positions, the independent values of network resources can be expressed through the yield of respective stocks. Based on this, for the relatively high search popularity rating, to which the stock of Silver Billion Shares belong to, its weight in the stock portfolio can be expressed as: 33200/(33200+49800+28500+73200+59100)=332/2438; for the medium search popularity rating, to which the stock of Emerging Cast Pipe belong to, its weight in the stock portfolio can be expressed as: 49800/(33200+49800+28500+73200+59100)=498/2438. Based on this, for the relative high search popularity rating, to which the stock of Silver Billion Shares belong to, its value in the stock portfolio can be expressed as: yield of the Silver Billion Shares; for the medium search popularity rating, to which the stock of Emerging Cast Pipe belong to, its value in the stock portfolio can be expressed as: yield of Emerging Cast Pipe; etc.

In this embodiment, an evaluation index for evaluating the portfolio value of a network resource portfolio is determined in advance. Depending on the application scenario and the category of network resources involved in the network resource portfolio, the evaluation index may be different. After obtaining the weight and value of each search popularity rating in the network resource portfolio, one may calculate at least one evaluation index value based on the information, and evaluate the portfolio value of the network portfolio based on the obtained evaluation index value, thereby obtaining an evaluation result. The evaluation result may be information that the value of the portfolio value of the network resource portfolio is high or low, or may be a score of the portfolio value of the network resource portfolio, etc.

Further, in order to facilitate evaluation of the portfolio value of a network resource portfolio, a benchmark resource portfolio corresponding to the network resource portfolio may be set in advance, and the weight and the value of each search popularity rating in the benchmark resource portfolio may be set. The benchmark resource portfolio may be a portfolio of representative network resources in the industry. For example, according to the number of network resources in the network resource portfolio and the popularity search ratings to which respective network resources belong, one may select, from the representative network resources in the industry, the same number of network resources belonging to the same ratings to form the benchmark resource portfolio. For each network resource representative of the industry, a representative independent value and weight may be given by the official; based on this, the weight and value in the benchmark resource portfolio for each search popularity rating in the set of search popularity ratings can be obtained based on the official value and official weight of the network resources in the benchmark resource portfolio.

Based on the above, it is possible to determine at least one intermediate index value based on the weight and the value in the network resource portfolio for each searching popularity rating in the set of search popularity ratings and the weight and the value in a benchmark resource portfolio for each searching popularity rating in the set of search popularity ratings; and to calculate the at least one evaluation index value based on the at least one intermediate index value.

Specifically, at least one weighted value of each of the search popularity ratings in the set search popularity ratings may be calculated based on the weight and the value in the network resource portfolio for each search popularity rating in the set of search popularity ratings and the weight and the value in the benchmark resource portfolio for each search popularity rating in the set of search popularity rating; and for each type of weighted values, the weighted values of all the searched popularity ratings is accumulated to obtain an intermediate index value. Herein, any one of the weight of the search popularity rating in the network resource portfolio and the weight of the search popularity rating in the benchmark resource portfolio may be multiplied with any one of the value of the search popularity rating in the network resource portfolio and the value of the search popularity rating in the benchmark resource portfolio, each multiplication result being a weighted value of the search popularity rating.

For example, at least one intermediate index value may be calculated using the following equation (2):

$$Q_i = \sum_j w_j^m \times r_j^l \qquad (2)$$

Wherein, in can be taken as b or p, similarly l can be taken as b or p, p signifies a network resource portfolio, b signifies a benchmark resource portfolio, and $Q_i$ represents four intermediate index values. The values of i are 1, 2, 3, 4.

Specifically, the following four intermediate index values can be obtained:

$$Q_1 = \sum_j w_j^b \times r_j^b \qquad (3)$$

$$Q_2 = \sum_j w_j^p \times r_j^b \qquad (4)$$

$$Q_3 = \sum_j w_j^b \times r_j^p \qquad (5)$$

$$Q_4 = \sum_j w_j^p \times r_j^p \qquad (6)$$

$$w_j^p w_j^b j$$

In the above formulas (3)-(6), $w_j^p$ represents the weight of the search popularity rating j in the network resource portfolio; $w_j^h$ represents the weight of the search popularity rating j in the benchmark resource portfolio; $r_j^p$ represents the value of the search popularity rating j in the network resource portfolio; $r_j^h$ represents the value of the popularity rating j in the benchmark resource portfolio. Taking the stock portfolio as shown in Table 1 as an example, one can use the above formula to calculate the four intermediate index values corresponding to the stock portfolio.

Based on the above four intermediate index values, an evaluation index for evaluating the portfolio value of the network resource portfolio may be referred to as a search popularity allocation contribution index $R_{search}$, which is calculated using the following formula (7)

$$R_{search} = Q_2 - Q_1 = \sum_j (w_j^p - w_j^b) \times r_j^p \qquad (7)$$

Taking the case where the network resource portfolio is a stock portfolio as an example, the search popularity allocation contribution index is mainly used to measure, in the cases where the user chooses the percentages of search popularity ratings in the portfolio of stock resources by himself, the return value that is the amount by which the total return of the portfolio of stocks exceeds the total return of the benchmark resource portfolio.

Based on the above four intermediate index values, another evaluation index for evaluating the portfolio value of the network resource portfolio may be called the resource selection contribution index, the resource selection contribution index $R_{stock}$ is calculated using the following formula (8):

$$R_{stock} = Q_3 - Q_1 = \sum_j w_j^b \times (r_j^p - r_j^b) \quad (8)$$

Taking the case where the network resource portfolio is a stock portfolio as an example, the resource selection contribution index may also be called individual stock selection contribution index, which is mainly used to measure, in the cases where the user chooses the percentages of individual stocks by himself, the return value that is the amount by which the total return of the portfolio of stocks exceeds the total return of the benchmark resource portfolio.

Based on the above four intermediate index values, another evaluation index for evaluating the portfolio value of the network resource portfolio can be called the interaction contribution index, the interaction contribution index $R_{ie}$ is calculated by the following equation (9):

$$R_{ie} = Q_1 + Q_4 - Q_2 - Q_3 = \sum_j (w_j^p - w_j^b) \times (r_j^p - r_j^b) \quad (9)$$

Taking the case where the network resource portfolio is a stock portfolio as an example, the interaction contribution index is mainly used to measure, in the cases where the user chooses the percentages of individual stocks by himself, the return value that is the amount by which the total return of the portfolio of stocks exceeds the total return of the benchmark resource portfolio. Herein, part of the excess return of the stock resource portfolio comes from allocation of the percentages of search popularity ratings in the portfolio of stock resources, another part comes from selection of individual stocks.

Based on the above four intermediate index, another evaluation index for evaluating the portfolio value of the network resource portfolio may be referred to as the total excess return index $R_{toal}$, which is calculated by the following equation (10):

$$R_{toal} = Q_4 - Q_1 = \sum_j w_j^p r_j^p - w_j^b r_j^b \quad (10)$$

The above-mentioned at least one evaluation index value can determine whether a network resource portfolio is reasonable and whether it needs adjustment. For example, the at least one evaluation index value may be compared with a preset evaluation index threshold, and if the at least one evaluation index value is smaller than the corresponding evaluation index threshold, the network resource portfolio is considered to need adjustment; if not, the network resource portfolio does not need to be adjusted. The present embodiment merely illustrates a simple determination method, the embodiment is not limited thereto.

Further, considering the periodicity of the network resource portfolio, it is possible to evaluate the portfolio value of the network resource portfolios based the search popularity ratings to which respective network resources belong in a single-cycle network resource portfolio, or it is possible to simultaneously evaluate the portfolio value of the network resource portfolios based the search popularity ratings to which respective network resources belong in multiple cycles. For convenience of description, multiple cycles for evaluating a network resource portfolio are referred to as an evaluation period, and the evaluation period includes a plurality of single cycles.

Specifically, one can perform: determining at least one intermediate index value based on the weight and the value in the network resource portfolio for each searching popularity rating in the set of search popularity ratings and the weight and the value in a benchmark resource portfolio for each searching popularity rating in the set of search popularity ratings; determining at least one evaluation index value in each cycle included in the evaluation period based on the at least one intermediate index value; calculating a corresponding weighting coefficient of the at least one evaluation index value in said each cycle included in the evaluation period; calculating a weighted sum on the evaluation index values in said each cycle based on corresponding weighting coefficients of respective evaluation index values in said each cycle, so as to obtain at least one index value in the evaluation period; and evaluating the portfolio value of the network resource portfolio, based on the at least one evaluation index in the evaluation period.

The above step of calculating a weighted sum on the evaluation index values in said each cycle based on corresponding weighting coefficients of respective evaluation index values in said each cycle, so as to obtain at least one index value in said each cycle is as follows:

The total excess return index in the evaluation period, the search popularity allocation contribution index, and the resource selection contribution index are calculated according to formulas (11)-(13).

$$R'_{toal} = \sum_{t=1}^{N} \beta_t R_{toal,t} \quad (11)$$

$$R'_{search} = \sum_{t=1}^{N} \beta_t R_{search,t} \quad (12)$$

$$R'_{stock} = \sum_{t=1}^{N} \beta_t R_{stock,t} \quad (13)$$

$$\beta_t = \frac{K_t}{K_o}$$

In the above formulas, $\beta_t$ signifies the weighting coefficient in cycle t, N represents the number of cycles included in the evaluation period, and $$\beta_t = \frac{K_t}{K}.$$

In the above formulas, $$K_t = \frac{\ln(1 + R_{p,t}) - \ln(1 + R_{b,t})}{R_{p,t} - R_{b,t}},$$

$R_{p,t}$ denotes the return rate of the of the network resource portfolio in cycle t, and $R_{b,t}$ denotes the return rate of the of the benchmark resource portfolio in cycle t.

In the above formulas, $$K = \frac{\ln(1 + R_p) - \ln(1 + R_b)}{R_p - R_b},$$

$R_p$ denote the return rate of the network resource portfolio in the evaluation period, $R_p=\Pi_{t=1}^{N}(1+R_{p,t})-1$; $R_b$ denotes the return rate of the benchmark resource portfolio in the evaluation period, $R_b=\varnothing_{t=1}^{N}(1\pm R_{b,t})-1$.

Herein, the approach where the portfolio value of the network resource portfolio is evaluated with the evaluation index value in a single cycle is suitable to the buying and holding type of portfolio of stock resources with low frequency of the position transferring. The approach of evaluating the portfolio value of the network resource portfolio by the evaluation index value in a plurality of cycles is applicable to a portfolio of transactional stock resources with a relatively high frequency of position transferring.

In addition, the method provided in this embodiment can be used in financial and investment field, it can be used not only to determine whether the financial investment portfolio needs to be adjusted to optimize the financial investment portfolio, but also to determine the ability of the financial commissioner to provide the financial investment portfolio, such as individual stock selecting ability, search popularity rating allocation ability, and comprehensive ability, etc., which is conducive to providing general investors with proposals, so that ordinary investors can choose financial experts and financial investment portfolio.

It is to be noted that each of the above-described method embodiments is described as a series of actions for the sake of simplicity of description, but those skilled in the art will recognize that the present invention is not limited to the described sequence of actions, because certain steps may be performed in other sequences or simultaneously in accordance with the present invention. Secondly, it will also be appreciated by those skilled in the art that the embodiments described in the specification belong to preferred embodiments, and that the actions and modules involved are not necessarily essential to the invention.

In the above-described embodiment, the description of each embodiment has its own emphasis, and portions not detailed in one embodiment can be found in the related description of other embodiments.

Figure 2:
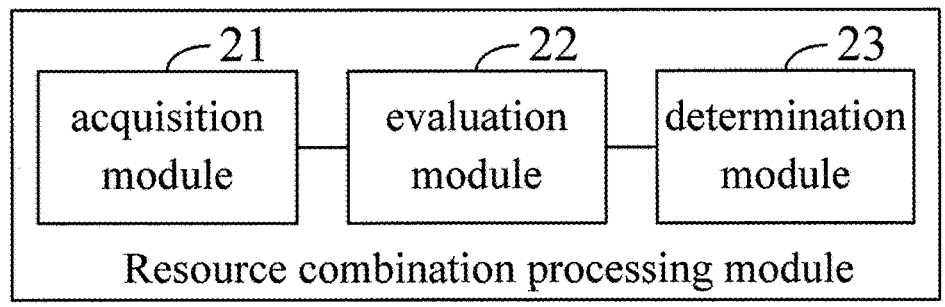
FIG. 2 is a schematic diagram showing a resource portfolio processing device according to another embodiment of the present invention.

FIG. 2 is a schematic diagram showing the allocation of a resource portfolio processing device according to an embodiment of the present invention. As shown in FIG. 2, the device includes an acquisition module 21, an evaluation module 22, and a determination module 23.

The acquisition module 21 is used for acquiring search popularity ratings to which respective network resources belong, based on search volume data of the respective network resources in a network resource portfolio.

The evaluation module 22 is used for evaluating the portfolio value of the network resource portfolio to obtain an evaluation result, based on the search popularity ratings to which the respective network resources belong.

The determination module 23 is used for determining whether or not the network resource portfolio needs to be adjusted based on the evaluation result.

In an optional embodiment, the acquisition module 21 is specifically used for: determining search popularity degrees of respective network resources based on search volume data of the respective network resources;

determining search popularity ratings to which respective network resources belong based on the search popularity degrees of respective network resources and preset popularity rating thresholds.

In an optional embodiment, when determining search popularity degrees of respective network resources based on search volume data of the respective network resources, the acquisition module 21 is specifically used for:

determining search popularity degrees of respective network resources based on the formula (1). The description of formula (1) can be found in the aforementioned method embodiments.

In one optional embodiment, before determining the search popularity rating to which respective network resources belongs based on the search popularity degrees of respective network resources and the preset popularity rating threshold the acquisition module is further used for:

determining a network resource category related to the network resource portfolio;

determining at least one popularity rating threshold based on the search popularity degrees of all available network resources under the network resource category.

In one optional embodiment, the evaluation module 22 is specifically used for:

doing statistics on the search popularity ratings to which the respective network resources belong, so as to determine a set of searching popularity ratings related to the network resource portfolio;

obtaining a weight and a value in the network resource portfolio for each search popularity rating in the set of search popularity rating;

calculating at least one evaluation index value based on the weight and the value in the network resource portfolio for each searching popularity rating in the set of search popularity ratings;

and evaluating the portfolio value of the network resource portfolio to obtain an evaluation result, based on the at least one evaluation index.

Further, when obtaining a weight and a value in the network resource portfolio for each search popularity rating in the set of search popularity rating, the evaluation module 22 is specifically used for:

obtaining, for each search popularity rating in the set of search popularity ratings, a weight in the network resource portfolio for the search popularity rating based on a resource percentage of the resources belonging to the search popularity rating, and a value in the network resource portfolio for the search popularity rating based on an independent value of the resources belonging to the search popularity rating.

For example, the evaluation module 22 may use the resource percentage of the network resources belonging to the search popularity rating to represent the weight of the search popularity rating in the network resource portfolio. Likewise, the evaluation module 22 may use the sum of the independent values of the network resources belonging to the search popularity rating to represent the value of the search popularity rating in the network resource portfolio.

Further, when calculating at least one evaluation index value based on the weight and the value in the network resource portfolio for each searching popularity rating in the set of search popularity ratings, the evaluation module 22 is specifically used for:

determining at least one intermediate index value based on the weight and the value in the network resource portfolio for each searching popularity rating in the set of search popularity ratings and the weight and the value in a benchmark resource portfolio for each searching popularity rating in the set of search popularity ratings, calculating the at least one evaluation index value based on the at least one intermediate index value.

The benchmark resource portfolio may be a portfolio of representative network resources in the industry. For example, based on the number of network resources in the network resource portfolio and the popularity search rating to which respective network resources belong, one may select, from the representative network resources in the industry, the same number of network resources belonging to the same rating of search popularity degree to form the benchmark resource portfolio. For respective network resources representative of the industry, a representative independent value and weight may be given by the official; based on this, the weight and value in the benchmark resource portfolio for each search popularity rating in the set of search popularity ratings can be obtained based on the official value and official weight of the network resources in the benchmark resource portfolio.

Specifically, the evaluation module 22 is specifically used to achieve the following: at least one weighted value of each of the search popularity ratings in the set search popularity ratings may be calculated based on the weight and the value in the network resource portfolio for each search popularity rating in the set of search popularity ratings and the weight and the value in the benchmark resource portfolio for each search popularity rating in the set of search popularity rating; and for each type of weighted values, the weighted values of all the searched popularity ratings is accumulated to obtain an intermediate index value. Herein, any one of the weight of the search popularity rating in the network resource portfolio and the weight of the search popularity rating in the benchmark resource portfolio may be multiplied with any one of the value of the search popularity rating in the network resource portfolio and the value of the search popularity rating in the benchmark resource portfolio, each multiplication result being a weighted value of the search popularity rating.

For example, the evaluation module 22 may calculate the intermediate index value according to the above equations (2)-(6).

Further, the evaluation module 22 may calculate at least one evaluation index value according to the above equations (7)-(10).

Further, when calculating at least one evaluation index value based on the weight and the value in the network resource portfolio for each searching popularity rating in the set of search popularity ratings, the evaluation module 22 can be specifically used for:

determining at least one intermediate index value based on the weight and the value in the network resource portfolio for each searching popularity rating in the set of search popularity ratings and the weight and the value in a benchmark resource portfolio for each searching popularity rating in the set of search popularity ratings;

determining at least one evaluation index value in each cycle included in the evaluation period based on the at least one intermediate index value;

calculating a corresponding weighting coefficient of each of the at least one evaluation index value in said each cycle;

calculating a weighted sum on the evaluation index values in said each cycle based on corresponding weighting coefficients of respective evaluation index values in said each cycle, so as to obtain at least one index value in said each cycle.

Alternatively, the evaluation module 22 may calculate the total excess return index during the evaluation period, the search popularity allocation contribution index, and the resource selection contribution index, respectively, according to the formulas (11) to (13).

Alternatively, the network resource portfolio of the present embodiment may be an investment resource portfolio in the field of investment and finance, for example, a portfolio of stock resources; accordingly, the respective network resources in the network resource portfolio may be stock resources. For example, a stock resource portfolio can be a portfolio of various stocks such as Silver Billion Shares, Emerging Cast Pipe, Beijing Culture, and Yituo Shares.

The resource portfolio processing device according to the present embodiment solves the problem of how to determine whether it is necessary to adjust a network resource portfolio so as to facilitate the timely adjustment of the network resource portfolio and give full play to the advantages of network resources, through the following: acquiring search popularity ratings to which respective network resources belong, based on search volume data of the respective network resources in a network resource portfolio; evaluating the portfolio value of the network resource portfolio to obtain an evaluation result, based on the search popularity ratings to which the respective network resources belong; determining whether or not the network resource portfolio needs to be adjusted based on the evaluation result.

It will be apparent to those skilled in the art that for the sake of convenience and conciseness of the description, the specific operations of the systems, apparatuses and units described above may be understood with bases to corresponding processes in the method embodiments described above, which will not be described herein.

As should be understood, in the various embodiments of the present invention, the disclosed systems, devices, and methods can be implemented through other ways. For example, the embodiments of the devices described above are merely illustrative. For example, the division of the units is only a logical functional division, the division may be done in other ways in actual implementations.

The units described as separate members may be or may be not physically separated, the components shown as units may or may not be physical units, which can be located in one place, or distributed in a number of network units. One can select some or all of the units to achieve the purpose of the embodiments according to the embodiment of the actual needs.

Further, in the embodiment of the present invention, the functional units in each embodiment may be integrated in a processing unit, or each unit may be a separate physical existence, or two or more units can be integrated in one unit. The integrated units described above can be used both in the form of hardware, or in the form of software plus hardware.

The aforementioned integrated unit implemented in the form of software may be stored in a computer readable storage medium. Said functional units of software are stored in a storage medium, including a number of instructions to instruct a computer device (it may be a personal computer, server, or network equipment, etc.) or processor to perform some steps of the method described in various embodiments of the present invention. The aforementioned storage medium includes: U disk, removable hard disk, read-only memory (ROM), a random access memory (RAM), magnetic disk, or an optical disk medium that may store program code.

The foregoing are only preferred embodiments of the present invention, not intended to limit the present invention, any modifications, equivalent substitutions and improvements made within the spirit and principles of the present invention should be included in the present invention.

We claim:

1. A resource portfolio processing method, comprising:
acquiring search popularity ratings to which respective network resources belong, based on search volume data of the respective network resources in a network resource portfolio;
evaluating a portfolio value of the network resource portfolio to obtain an evaluation result, based on the search popularity ratings to which the respective network resources belong;
determining whether or not the network resource portfolio needs to be adjusted based on the evaluation result;
wherein the search volume data reflects a search popularity degree of the respective network resource and the search popularity degrees are divided into different search popularity ratings,
wherein the step of evaluating the portfolio value of the network resource portfolio to obtain an evaluation result, based on the search popularity rating to which respective network resources belongs comprises:
doing statistics on the search popularity ratings to which the respective network resources belong, so as to determine a set of searching popularity ratings related to the network resource portfolio,
obtaining a weight and a value in the network resource portfolio for each search popularity rating in the set of search popularity rating;
calculating at least one evaluation index value based on the weight and the value in the network resource portfolio for each searching popularity rating in the set of search popularity ratings; and
evaluating the portfolio value of the network resource portfolio to obtain an evaluation result, based on the at least one evaluation index.

2. The method according to claim 1, wherein the step of acquiring search popularity ratings to which respective network resources belong, based on search volume data of the respective network resources in a network resource portfolio comprises:
determining search popularity degrees of respective network resources based on search volume data of the respective network resources;
determining search popularity ratings to which the respective network resources belong based on the search popularity degrees of respective network resources and preset popularity rating thresholds.

3. The method according to claim 2, wherein the step of determining search popularity degrees of the respective network resources based on search volume data of the respective network resources comprises:
determining search popularity degrees of the respective network resources based on a formula $schpop_{i,T}=schvol_{i,T-1}/schvol_{i,T-2}$, in which
$schpop_{i,T}$ signifies the search popularity degree of the $i^{th}$ network resource in a time unit T, $schvol_{i,T-1}$ signifies the search volume data of the $i^{th}$ network resource in the time unit T-1, and $schvol_{i,T-2}$ signifies the search volume data of the $i^{th}$ network resource in the time unit T-2.

4. The method according to claim 2, wherein before the step of determining the search popularity rating to which the respective network resources belongs based on the search popularity degrees of respective network resources and at least one preset popularity rating threshold, the method comprises:
determining a network resource category related to the network resource portfolio;
determining the at least one popularity rating threshold based on the search popularity degrees of all available network resources under the network resource category.

5. The method according to claim 1, wherein the step of obtaining a weight and a value in the network resource portfolio for each search popularity rating in the set of search popularity rating comprises:
obtaining, for each search popularity rating in the set of search popularity ratings, a weight in the network resource portfolio for the search popularity rating based on a resource percentage of the resources belonging to the search popularity rating, and a value in the network resource portfolio for the search popularity rating based on an independent value of the resources belonging to the search popularity rating.

6. The method according to claim 1, wherein the step of calculating at least one evaluation index value based on the weight and the value in the network resource portfolio for each searching popularity rating in the set of search popularity ratings comprises:
determining at least one intermediate index value based on the weight and the value in the network resource portfolio for each searching popularity rating in the set of search popularity ratings and the weight and the value in a benchmark resource portfolio for each searching popularity rating in the set of search popularity ratings,
calculating the at least one evaluation index value based on the at least one intermediate index value.

7. The method according to claim 1, wherein the step of calculating at least one evaluation index value based on the weight and the value in the network resource portfolio for each searching popularity rating in the set of search popularity ratings comprises:
determining at least one intermediate index value based on the weight and the value in the network resource portfolio for each searching popularity rating in the set of search popularity ratings and the weight and the value in a benchmark resource portfolio for each searching popularity rating in the set of search popularity ratings;
calculating at least one evaluation index value in each cycle included in the evaluation period based on the at least one intermediate index value;
calculating a corresponding weighting coefficient of each of the at least one evaluation index value in in said each cycle;
calculating a weighted sum on the evaluation index values in said each cycle based on corresponding weighting coefficients of respective evaluation index values in said each cycle, so as to obtain at least one index value in said each cycle.

8. The method according to claim 1, wherein the network resource portfolio is a portfolio of stock resources, and the network resources are stock resources.

9. A nonvolatile computer storage medium, stored with one or more programs, which, when executed by an apparatus, make the apparatus to execute the following operation:
acquiring search popularity ratings to which respective network resources belong, based on search volume data of the respective network resources in a network resource portfolio;

evaluating a portfolio value of the network resource portfolio to obtain an evaluation result, based on the search popularity ratings to which the respective network resources belong;

determining whether or not the network resource portfolio needs to be adjusted based on the evaluation result;

wherein the search volume data reflects a search popularity degree of the respective network resource and the search popularity degrees are divided into different search popularity ratings, wherein the step of evaluating the portfolio value of the network resource portfolio to obtain an evaluation result, based on the search popularity rating to which respective network resources belongs comprise:

doing statistics on the search popularity ratings to which the respective network resources belong, so as to determine a set of searching popularity ratings related to the network resource portfolio;

obtaining a weight and a value in the network resource portfolio for each search popularity rating in the set of search popularity rating;

calculating at least one evaluation index value based on the weight and the value in the network resource portfolio for each searching popularity rating in the set of search popularity ratings; and evaluating the portfolio value of the network resource portfolio to obtain an evaluation result, based on the at least one evaluation index.

10. The nonvolatile computer storage medium according to claim 9, wherein the operation of acquiring search popularity ratings to which respective network resources belong, based on search volume data of the respective network resources in a network resource portfolio comprises:

determining search popularity degrees of respective network resources based on search volume data of the respective network resources;

determining search popularity ratings to which the respective network resources belong based on the search popularity degrees of respective network resources and preset popularity rating thresholds.

11. The nonvolatile computer storage medium according to claim 10, wherein the operation of determining search popularity degrees of the respective network resources based on search volume data of the respective network resources comprises:

determining search popularity degrees of the respective network resources based on a formula $schpop_{i,T}=schvol_{i,T-1}/schvol_{i,T-2}$, in which $schpop_{i,T}$ signifies the search popularity degree of the $i^{th}$ network resource in a time unit T, $schvol_{i,T-1}$ signifies the search volume data of the $i^{th}$ network resource in the time unit T-1, and $schvol_{i,T-2}$ signifies the search volume data of the $i^{th}$ network resource in the time unit T-2.

12. The nonvolatile computer storage medium according to claim 10, wherein before the operation of determining the search popularity rating to which the respective network resources belongs based on the search popularity degrees of respective network resources and at least one preset popularity rating threshold, the operations further comprise:

determining a network resource category related to the network resource portfolio;

determining the at least one popularity rating threshold based on the search popularity degrees of all available network resources under the network resource category.

13. The nonvolatile computer storage medium according to claim 9, wherein the operation of obtaining a weight and a value in the network resource portfolio for each search popularity rating in the set of search popularity rating comprises:

obtaining, for each search popularity rating in the set of search popularity ratings, a weight in the network resource portfolio for the search popularity rating based on a resource percentage of the resources belonging to the search popularity rating, and a value in the network resource portfolio for the search popularity rating based on an independent value of the resources belonging to the search popularity rating.

14. The nonvolatile computer storage medium according to claim 13, the operation of calculating at least one evaluation index value based on the weight and the value in the network resource portfolio for each searching popularity rating in the set of search popularity ratings comprises:

determining at least one intermediate index value based on the weight and the value in the network resource portfolio for each searching popularity rating in the set of search popularity ratings and the weight and the value in a benchmark resource portfolio for each searching popularity rating in the set of search popularity ratings, calculating the at least one evaluation index value based on the at least one intermediate index value.

15. The nonvolatile computer storage medium according to claim 6, wherein the operation of calculating at least one evaluation index value based on the weight and the value in the network resource portfolio for each searching popularity rating in the set of search popularity ratings comprises:

determining at least one intermediate index value based on the weight and the value in the network resource portfolio for each searching popularity rating in the set of search popularity ratings and the weight and the value in a benchmark resource portfolio for each searching popularity rating in the set of search popularity ratings;

determining at least one evaluation index value in each cycle included in the evaluation period based on the at least one intermediate index value;

calculating a corresponding weighting coefficient of each of the at least one evaluation index value in said each cycle;

calculating a weighted sum on the evaluation index values in said each cycle based on corresponding weighting coefficients of respective evaluation index values in said each cycle, so as to obtain at least one index value in said each cycle.

16. The nonvolatile computer storage medium according to claim 9, wherein the network resource portfolio is a portfolio of stock resources, and the network resources are stock resources.

17. An apparatus, comprising:
one or more processors;
a memory;
one or more programs, which are stored in the memory, and execute the following operations when executed by the one or more processors:

acquiring search popularity ratings to which respective network resources belong, based on search volume data of the respective network resources in a network resource portfolio;

evaluating a portfolio value of the network resource portfolio to obtain an evaluation result, based on the search popularity ratings to which the respective network resources belong;

determining whether or not the network resource portfolio needs to be adjusted based on the evaluation result;

wherein the search volume data reflects a search popularity degree of the respective network resource and the search popularity degrees are divided into different search popularity ratings, wherein the step of evaluating the portfolio value of the network resource portfolio to obtain an evaluation result, based on the search popularity rating to which respective network resources belongs comprises:

doing statistics on the search popularity ratings to which the respective network resources belong, so as to determine a set of searching popularity ratings related to the network resource portfolio;

obtaining a weight and a value in the network resource portfolio for each search popularity rating in the set of search popularity rating;

calculating at least one evaluation index value based on the weight and the value in the network resource portfolio for each searching popularity rating in the set of search popularity ratings; and evaluating the portfolio value of the network resource portfolio to obtain an evaluation result, based on the at least one evaluation index.

18. The apparatus according to claim 17, wherein the operation of acquiring search popularity ratings to which respective network resources belong, based on search volume data of the respective network resources in a network resource portfolio comprises:

determining search popularity degrees of respective network resources based on search volume data of the respective network resources;

determining search popularity ratings to which the respective network resources belong based on the search popularity degrees of respective network resources and preset popularity rating thresholds.

19. The apparatus according to claim 18, wherein the operation of determining search popularity degrees of the respective network resources based on search volume data of the respective network resources comprises:

determining search popularity degrees of the respective network resources based on a formula $schpop_{i,T} = schvol_{i,T-1}/schvol_{i,T-2}$, in which $schpop_{i,T}$ signifies the search popularity degree of the $i^{th}$ network resource in a time unit T, $schvol_{i,T-1}$ signifies the search volume data of the $i^{th}$ network resource in the time unit T-1, and $schvol_{i,T-2}$ signifies the search volume data of the $i^{th}$ network resource in the time unit T-2.

20. The apparatus according to claim 18, wherein before the operation of determining the search popularity rating to which the respective network resources belongs based on the search popularity degrees of respective network resources and at least one preset popularity rating threshold, the operation further comprise:

determining a network resource category related to the network resource portfolio;

determining the at least one popularity rating threshold based on the search popularity degrees of all available network resources under the network resource category.

21. The apparatus according to claim 20, wherein the operation of obtaining a weight and a value in the network resource portfolio for each search popularity rating in the set of search popularity rating comprises:

obtaining, for each search popularity rating in the set of search popularity ratings, a weight in the network resource portfolio for the search popularity rating based on a resource percentage of the resources belonging to the search popularity rating, and a value in the network resource portfolio for the search popularity rating based on an independent value of the resources belonging to the search popularity rating.

22. The apparatus according to claim 20, wherein the operation of calculating at least one evaluation index value based on the weight and the value in the network resource portfolio for each searching popularity rating in the set of search popularity ratings comprises:

determining at least one intermediate index value based on the weight and the value in the network resource portfolio for each searching popularity rating in the set of search popularity ratings and the weight and the value in a benchmark resource portfolio for each searching popularity rating in the set of search popularity ratings, calculating the at least one evaluation index value based on the at least one intermediate index value.

23. The apparatus according to claim 20, wherein the operation of calculating at least one evaluation index value based on the weight and the value in the network resource portfolio for each searching popularity rating in the set of search popularity ratings comprises:

determining at least one intermediate index value based on the weight and the value in the network resource portfolio for each searching popularity rating in the set of search popularity ratings and the weight and the value in a benchmark resource portfolio for each searching popularity rating in the set of search popularity ratings;

calculating at least one evaluation index value in each cycle included in the evaluation period based on the at least one intermediate index value;

calculating a corresponding weighting coefficient of each of the at least one evaluation index value in in said each cycle;

calculating a weighted sum on the evaluation index values in said each cycle based on corresponding weighting coefficients of respective evaluation index values in said each cycle, so as to obtain at least one index value in said each cycle.

24. The apparatus according to claim 17, wherein the network resource portfolio is a portfolio of stock resources, and the network resources are stock resources.

* * * * *